2,802,831

3-(4-METHYLPHENOXY)PHTHALIDE

Donald D. Wheeler and David C. Young, Midland, Mich., assignors to The Dow Chemical Company, Midland, Mich., a corporation of Delaware No Drawing. Application April 30, 1956,
Serial No. 581,332

1 Claim. (Cl. 260—343.3)

This invention is directed to 3-(4-methylphenoxy)-phthalide having the structure

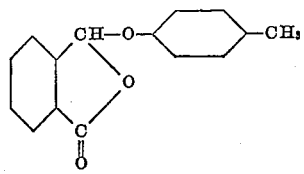

This new compound is a white, crystalline solid somewhat soluble in organic solvents such as benzene and acetone and substantially insoluble in water. It has been found to be valuable as a parasiticide and is adapted to be employed for the control of nematodes.

The compound of this invention is conveniently prepared by causing phthalaldehydic acid to react with p-cresol. The terms "phthalaldehydic acid" and "3-hydroxyphthalide" refer to a compound having the structure

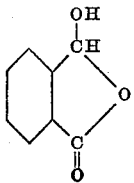

Phthalaldehydic acid is often represented in the literature as having the structure

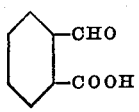

However, the acid employed in this invention and prepared as hereinafter described exists almost entirely in the closed ring, 3-hydroxyphthalide structure, as observed from a study of its infrared absorption spectrum. The infrared spectrum supports the closed ring 3-(4-methylphenoxy)phthalide structure for the product.

In the preferred method for carrying out the reaction, phthalaldehydic acid and p-cresol are heated in the temperature range of from 90° to 150° C. under reflux for one to four hours. A reaction takes place with the formation of 3-(4-methylphenoxy)phthalide product, 3-(2-hydroxy-5-methylphenyl)phthalide by-product and water of reaction. On completion of the heating, the reaction mixture is poured into water forming a heterogeneous mixture which separates into an aqueous phase and an organic product phase. The aqueous phase is decanted from the organic product and the latter washed in turn with water and aqueous alkali to obtain as residue a 3-(4-methylphenoxy)phthalide product. The latter may be purified by conventional procedures.

In a representative preparation, 54 grams (0.5 mole) of p-cresol and 75 grams (0.5 mole) of phthalaldehydic acid were heated in the temperature range of from 125° to 140° C. for three hours. The system was evacuated to about 25 millimeters and the mixture heated to 120° C. to distill the water of reaction. The residue was poured into water with the resultant formation of an oily organic phase and an aqueous phase. The latter was decanted and the organic phase washed repeatedly and in turn with water and dilute alkali. As the result of the washing a solid formed. The solid was purified by (1) isolating by filtration, (2) recrystallizing from benzene, (3) washing the resulting crystals with 0.5 N sodium hydroxide, (4) dissolving the washed crystals in a mixture of benzene and methyl ethyl ketone, (5) washing the solution with dilute alkali and (6) evaporating the solvents to obtain as residue a 3-(4-methylphenoxy)phthalide product melting at 107–109° C.

The novel compound of the present invention is useful for the control of larval rootknot nematodes. In a representative operation, 3-(4-methylphenoxy)phthalide was dispersed in water to prepare a composition containing 10 parts of the phthalide per million parts of dispersion. This composition gave good control of larvae of the rootknot nematode (Meloidogyne species) contacted therewith.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with aqueous constant boiling hydrochloric acid and ferric chloride solution, as more fully disclosed and claimed in the copending application of James D. Head and Owen D. Ivins, Serial Number 279,682, filed March 31, 1952, now Patent No. 2,748,162.

We claim:
3-(4-methylphenoxy)phthalide.

References Cited in the file of this patent
UNITED STATES PATENTS 2,150,595    Austin et al. _____ Mar. 14, 1939

FOREIGN PATENTS 523,466    Canada _____ Apr. 3, 1956

OTHER REFERENCES

Bistrzycki et al.: Berichte, Vol. 27, pp. 2632–40 (1894).